United States Patent [19]
Taylor

[11] Patent Number: 5,787,633
[45] Date of Patent: Aug. 4, 1998

[54] BALLISTIC FISHING LURE

[76] Inventor: John B. Taylor, 3364 Townsend, Dallas, Tex. 75229

[21] Appl. No.: 807,708

[22] Filed: Feb. 28, 1997

[51] Int. Cl.$^6$ ............................................. A01K 85/16
[52] U.S. Cl. .................................. 43/42.02; 43/42.36
[58] Field of Search .................. 43/42.02, 42.35, 43/42.36

[56] References Cited

U.S. PATENT DOCUMENTS

| | | | |
|---|---|---|---|
| 1,941,370 | 12/1933 | Vann | 43/42.36 |
| 2,700,842 | 2/1955 | Lehmann | 43/42.36 |
| 2,750,701 | 6/1956 | Beames | 43/42.36 |
| 2,794,287 | 6/1957 | Mancusi, Jr. | 43/42.02 |
| 2,932,112 | 4/1960 | Graves, Jr. | 43/42.02 |
| 3,054,209 | 9/1962 | Wiley, Jr. | 43/42.02 |
| 3,134,190 | 5/1964 | Triplett et al. | 43/42.36 |
| 4,208,822 | 6/1980 | Bryant | 43/42.02 |
| 4,676,020 | 6/1987 | Taylor et al. | 43/42.02 |
| 4,982,524 | 1/1991 | Vissing | 43/42.02 |
| 5,119,581 | 6/1992 | Rudolph | 43/42.22 |

*Primary Examiner*—Michael J. Carone
*Assistant Examiner*—Darren Ark
*Attorney, Agent, or Firm*—Daniel V. Thompson

[57] ABSTRACT

A fishing lure includes a tubular main body member having a longitudinal central axis. A cap is sealingly fixed to a rearward end of the main body member. A cylindrical guide tube is connected to the cap. A cylindrical inner tube is telescopingly engaged with the guide tube and extends forwardly out of the guide tube to terminate at a forward end. A cylindrical coil spring within the inner tube extends between the cap and inner tube forward end, which creates a jumping motion for the lure, when extended and then released.

14 Claims, 2 Drawing Sheets

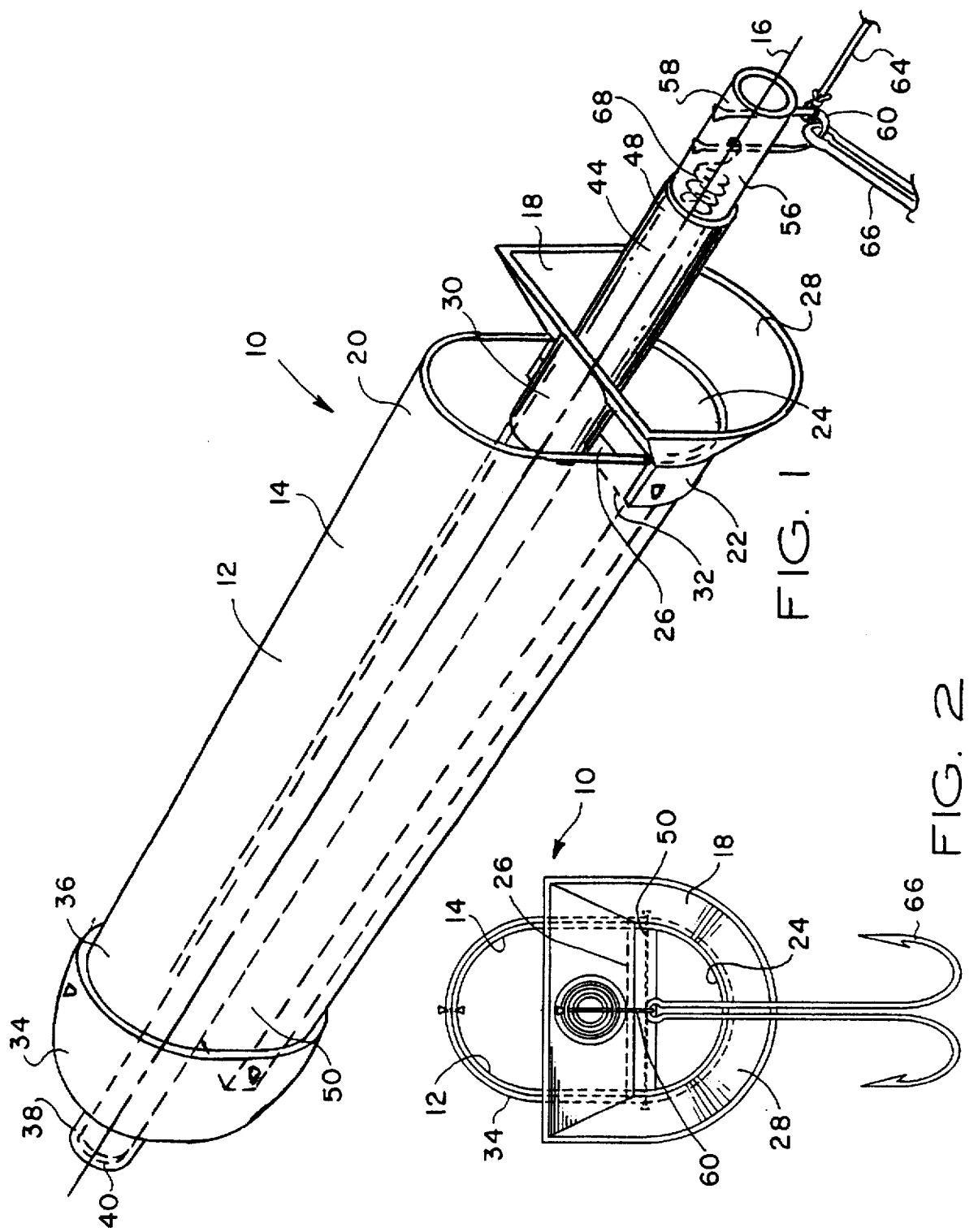

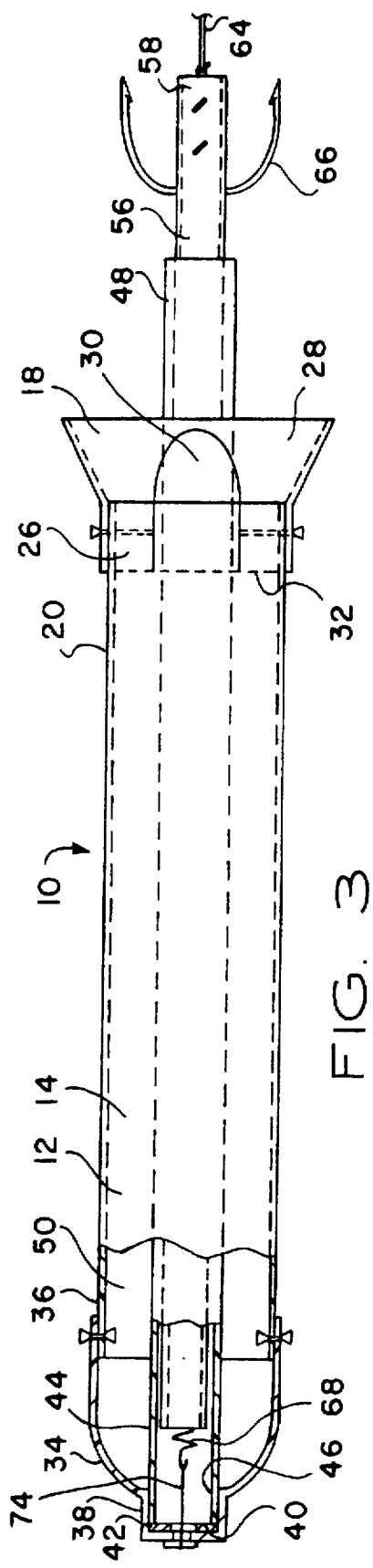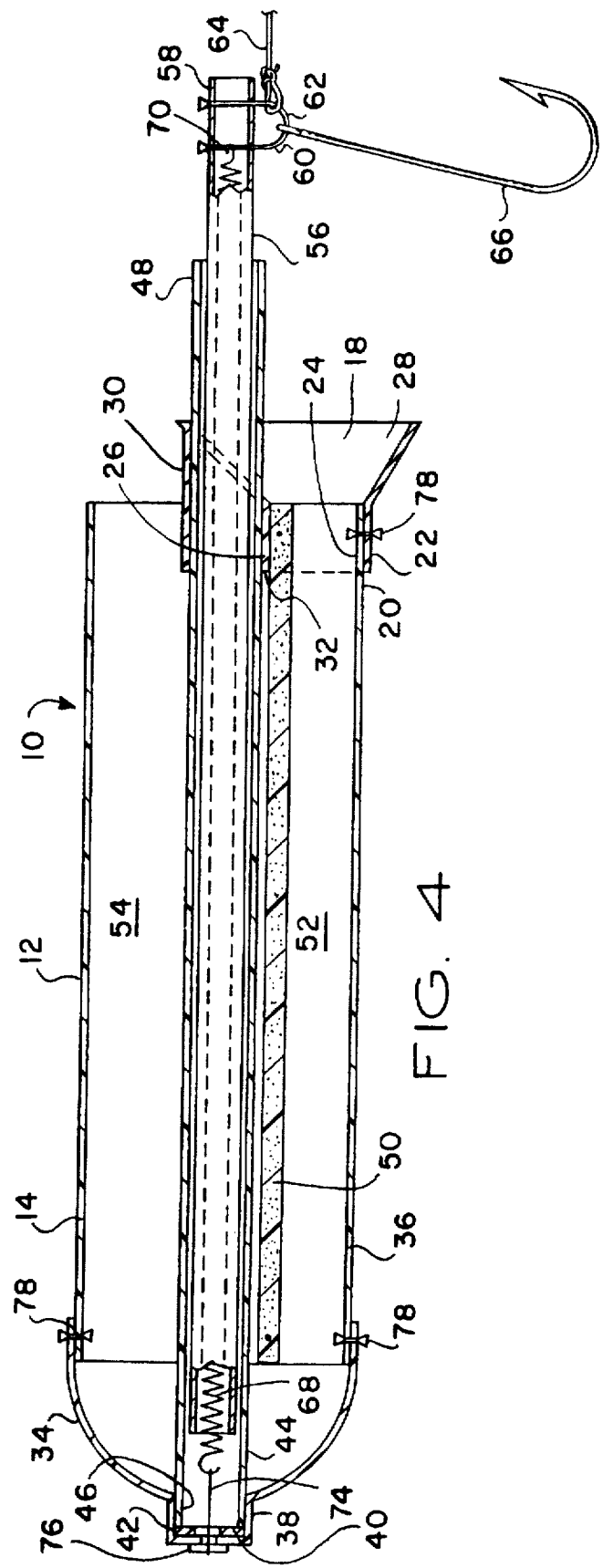

5,787,633

1

BALLISTIC FISHING LURE

TECHNICAL FIELD

This invention relates to a fishing lures, and more particularly a fishing lure having a fish-attractive jumping lure motion.

BACKGROUND ART

An almost infinite variety of styles and types of fishing lures are available. It has not been known, however, to provide a fishing lure that provides a jumping motion to simulate the motion of bait.

SUMMARY OF THE INVENTION

The present invention provides structure for using the drag of lure through the water to store energy to provide a jumping motion.

BRIEF DESCRIPTION OF THE DRAWINGS

A more complete understanding of the invention and its advantages will be apparent from the Detailed Description taken in conjunction with the accompanying Drawings, in which:

FIG. 1 is a perspective view of a fishing lure constructed in accordance with the invention;

FIG. 2 is an end view of the fishing lure;

FIG. 3 is a partially broken away top view of the fishing lure; and

FIG. 4 is a partially broken away side view of the fishing lure.

DETAILED DESCRIPTION OF THE PREFERRED EMBODIMENT

Referring initially to FIGS. 1-4, where like numerals indicate like and corresponding elements, a lure 10 includes a tubular main body member 12 formed from resilient film 14 and having equally-sized, capsule-shaped, cross-sections about a longitudinal central axis 16 (FIG. 1).

An input funnel 18 is fixed to a forward end 20 of the main body member 12. The input funnel 18 has a curved outer lower portion 22 closely interfitted with a lower portion 24 of the main body member forward end 20. Input funnel 18 has a flat portion 26 vertically above the outer lower section 22 and extending across and within the forward end 20 of the main body member 12. Input funnel 18 also has an outwardly diverging mouth portion 28 extending from the curved outer lower section 22 and flat portion 26. Forward end 20 is open above the funnel flat portion 26.

Input funnel 18 has a tubular boss 30 fixed atop the flat portion 26. Boss 30 has cylindrical cross-sections aligned with the central axis 16. Boss 30 extends from a rear edge 32 of the flat portion 26 to the mouth portion 28.

A cap 34 is sealingly fixed about a rearward end 36 of the main body 12. Cap 34 converges in a rearward direction to a tubular receiver portion 38 having cylindrical cross-sections aligned with the central axis 16 and being equally-sized with the cylindrical cross-sections of the input funnel boss 30. An impact washer 40 abuts an inner end surface 42 of the receiver portion 38.

A cylindrical guide tube 44 is interfitted with the receiver portion 38, with a rearward end 46 abutting the impact washer 40, such that the impact washer is captured between the receiver portion end surface 42 and the guide tube

2 rearward end 46. Guide tube 44 extends forwardly from the receiver portion 38 coaxially with the central axis 16 through the input funnel boss 30 to terminate forwardly of the mouth portion 28 at a forward end 48.

A rectangular block-shaped flotation platform 50 spans the main body member 12 beneath the guide tube 44. The flotation platform 50 has a volume and density selected to position the guide tube 44 just above the water line when the lure is in use. Flotation platform 50 defines inlet and outlet passageways, 52,54 (FIG. 4) through the main body member 12 that transition at the cap 34.

A cylindrical inner tube 56 is telescopingly engaged with the guide tube 44. Inner tube 56 extends forwardly out of the guide tube 44 to terminate at a forward end 58.

A forward connector 60 at the forward end 58 of the inner tube 56 has an exterior portion 62 (FIG. 4) adapted to connect to a fishing line 64 and a hook 66.

A cylindrical coil spring 68 within the inner tube 56 extends between an interior portion 70 (FIG. 4) of the forward connector 60 to a rearward connector 74 (FIGS. 3 and 4). Rearward connector 74 extends through an aperture in the impact washer 40 and an aperture in the receiver portion end surface 42 to a stop member 76 (FIG. 4) sized more largely than the apertures.

The length and spring rate of the coil spring 68 are selected such that when the lure 10 is pulled through water, with the input funnel 28 creating drag and circulating water through the inlet and outlet passageways 52, 54, the inner tube 56 telescopes with respect to the cap 34, thereby elongating the coil spring 68 to create tension opposing the drag. When tension on lure 10 is released, the inner tube 56 is translated under spring tension back through the guide tube 44 to strike the impact washer 40, thereby creating a fish-attractive, jumping lure motion.

In the preferred embodiment, the various parts are connected by deformable plastic connectors 78 (FIG. 4) formed from fishing line crimped at the ends. Those skilled in the art will recognize that other equivalent methods of connecting the parts are available. In addition, preferably film 14 is printed with a bait pattern, such as a shrimp or a bait fish pattern, although various colors and even transparent films may be usable. The balance and corresponding attitude of the lure may be adjusted by the provision of weights and careful selection of the weight of the hook.

In operation, the lure is hollow with a plastic film exterior. The film thickness is selected to emulate the firmness of the creature depicted on the film, where the film is printed. Flotation platform 50 positions the guide tube 44 just above the water. When the lure is pulled, water is forced into the input funnel 28 and is redirected 180° by the end cap 34, water being circulated though input and output passageways 52, 54. This forces the separation of the end cap 34 and the inner tube 56 to the extent permitted by the spring rate of the coil spring 68. When the pulling action on line 64 ceases, the spring pulls the inner tube 56 and end cap 34 together. Both the end cap 34 and the inner tube 56 have energy equal to their mass and the square of their velocities. The laws of physics state that no energy will be lost when the end cap and inner tube collide. The mass of the inner tube is much greater than the mass of the cap going backward. The velocity of the inner tube will be much greater than the velocity of the cap going forward, because the drag of the inner tube in air is much less than the drag of the cap in the water. Since the inner tube 56 has more energy, it will continue to move after it collides with the cap, sending the lure out of the water in a ballistic, jumping fashion.

Whereas, the present invention has been described with respect to a specific embodiment thereof, it will be understood that various changes and modifications will be suggested to one skilled in the art, and it is intended to encompass such changes and modifications as fall within the scope of the appended claims.

I claim:

1. A fishing lure, comprising:
   a tubular main body member having a longitudinal central axis;
   a cap sealingly fixed to a rearward end of the main body member;
   a cylindrical guide tube connected to the cap;
   a cylindrical inner tube telescopingly engaged with the guide tube and extending forwardly out of the guide tube to terminate at a forward end;
   a cylindrical coil spring inside the inner tube extending between the cap and the inner tube forward end;
   a forward connector with the inner tube for connection to a fishing line; and
   the length and spring rate of the coil spring being selected such that when the lure is pulled through water, with the lure creating drag, the inner tube telescopes with respect to the cap thereby elongating the coil spring to create tension opposing the drag, and when tension on the lure is released, the inner tube is translated under spring tension back through the guide tube to strike the cap, thereby creating a fish-attractive, jumping lure motion.

2. The fishing lure of claim 1 with the main body member formed from resilient film.

3. The fishing lure of claim 1 with the main body member having equally-sized, capsule-shaped, cross-sections.

4. The fishing lure of claim 1 with an input funnel fixed to a forward end of the main body member.

5. The fishing lure of claim 4 with the input funnel having a curved outer lower portion closely interfitted with a lower portion of the main body member forward end, the input funnel having a flat portion vertically above the outer lower portion and extending across and within the forward end of the main body member, the input funnel having an outwardly diverging mouth portion extending from the curved outer portion section and flat portion, and the main body member forward end being open above the funnel flat portion.

6. The fishing lure of claim 5 with the input funnel having a tubular boss fixed atop the flat portion, the boss having cylindrical cross-sections aligned with the central axis, and the boss extending from a rear edge of the flat portion to the mouth portion.

7. The fishing lure of claim 1 with the cap converging in a rearward direction to a tubular receiver portion having cylindrical cross-sections aligned with the central axis and being equally-sized with cylindrical cross-sections of an input funnel boss at the forward end of the main body portion.

8. The fishing lure of claim 7 with an impact washer abutting an inner end surface of the receiver portion.

9. The fishing lure of claim 1 with a rearward end of the guide tube abutting an impact washer captured between a receiver portion end surface of the cap and the guide tube rearward end, and with the guide tube extending forwardly from the receiver portion end surface coaxially with the central axis to a forward end.

10. The fishing lure of claim 1 with a rectangular block-shaped flotation platform spanning the main body member beneath the guide tube, the flotation platform having a volume and density selected to position the guide tube just above the water line when the lure is in use.

11. The fishing lure of claim 10 with the flotation platform defining inlet and outlet passageways through the main body member that transition at the cap.

12. The fishing lure of claim 1 with the connector at the forward end of the inner tube, the connector having an exterior portion adapted to connect the lure to the fishing line and a hook.

13. The fishing lure of claim 1 with the coil spring extending between an interior portion of the forward connector and a rearward connector, the rearward connector extending through an aperture in an impact washer and an aperture in the receiver portion end surface.

14. A fishing lure, comprising:
   a tubular main body member formed from resilient film and having equally-sized, capsule-shaped, cross-sections about a longitudinal central axis;
   an input funnel fixed to a forward end of the main body member, the input funnel having a curved outer lower portion closely interfitted with a lower portion of the main body member forward end, the input funnel having a flat portion vertically above the outer lower portion and extending across and within the forward end of the main body member, the input funnel having an outwardly diverging mouth portion extending from the curved outer lower portion and flat portion, and the main body member forward end being open above the funnel flat portion;
   with the input funnel having a tubular boss fixed atop the flat portion, the boss having cylindrical cross-sections aligned with the central axis, and the boss extending from a rear edge of the flat portion to the mouth portion;
   a cap sealingly fixed about a rearward end of the main body member, the cap converging in a rearward direction to a tubular receiver portion having cylindrical cross-sections aligned with the central axis and being equally-sized with the cylindrical cross-sections of the input funnel boss;
   an impact washer abutting an inner end surface of the receiver portion;
   a cylindrical guide tube interfitted with the receiver portion, with a rearward end abutting the impact washer such that the impact washer is captured between the receiver portion end surface and the guide tube rearward end, and with the guide tube extending forwardly from the receiver portion coaxially with the central axis through the input funnel boss to terminate forwardly of the mouth portion at a forward end;
   a rectangular block-shaped flotation platform spanning the main body member beneath the guide tube, the flotation platform having a volume and density selected to position the guide tube just above the water line when the lure is in use, and the flotation platform defining inlet and outlet passageways through the main body member that transition at the cap;
   a cylindrical inner tube telescopingly engaged with the guide tube and extending forwardly out of the guide tube to terminate at a forward end;

a forward connector at the forward end of the inner tube, the forward connector having an exterior portion adapted to connect the lure to a fishing line and a hook;

a cylindrical coil spring within the inner tube extending between an interior portion of the forward connector and a rearward connector, the rearward connector extending through an aperture in the impact washer and an aperture in the receiver portion end surface; and the length and spring rate of the coil spring being selected such that when the lure is pulled through water, with the input funnel creating drag and circulating water through the inlet and outlet passageways, the inner tube telescopes with respect to the cap thereby elongating the coil spring to create tension opposing the drag, and when tension on the lure is released, the inner tube is translated under spring tension back through the guide tube to strike the impact washer, thereby creating a fish-attractive, jumping lure motion.

* * * * *